US010162656B2

(12) United States Patent
Palavalli et al.

(10) Patent No.: US 10,162,656 B2
(45) Date of Patent: Dec. 25, 2018

(54) MINIMIZING GUEST OPERATING SYSTEM LICENSING COSTS IN A PROCESSOR BASED LICENSING MODEL IN A VIRTUAL DATACENTER

(71) Applicant: VMWARE, INC., Palo Alto, CA (US)

(72) Inventors: Amarnath Palavalli, Bangalore (IN); Kumar Gaurav, Bangalore (IN); T. N Ravi Kumar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 232 days.

(21) Appl. No.: 14/609,435

(22) Filed: Jan. 30, 2015

(65) Prior Publication Data

US 2016/0147553 A1 May 26, 2016

(30) Foreign Application Priority Data

Nov. 26, 2014 (IN) ............................ 5936/CHE/2014

(51) Int. Cl.
*G06F 9/455* (2018.01)
*G06F 21/12* (2013.01)
*G06F 21/53* (2013.01)
*G06Q 10/06* (2012.01)
*G06Q 30/06* (2012.01)

(52) U.S. Cl.
CPC ........ *G06F 9/45558* (2013.01); *G06F 21/121* (2013.01); *G06F 21/53* (2013.01); *G06Q 10/06* (2013.01); *G06Q 30/06* (2013.01); *G06F 9/45545* (2013.01); *G06F 2009/4557* (2013.01)

(58) Field of Classification Search
None
See application file for complete search history.

(56) References Cited

U.S. PATENT DOCUMENTS

| 6,496,948 | B1  |   | 12/2002 | Smorodinsky |
| 7,996,696 | B1  | * | 8/2011  | Haney ................... G06F 1/3287 713/300 |
| 2005/0132362 | A1 | * | 6/2005 | Knauerhase ........ G06F 9/45533 718/1 |
| 2009/0328056 | A1 | * | 12/2009 | McCune ................... G06F 8/61 718/105 |

(Continued)

OTHER PUBLICATIONS

James Smith and Ravi Nair "The Architecture of Virtual Machines", IEEE Computer Society, May 2005 https://ieeexplore.ieee.org/document/1430629/ (Year: 2005).

(Continued)

*Primary Examiner* — Tammy E Lee

(57) ABSTRACT

Techniques for optimizing guest operating system (OS) utilization cost in a processor based licensing model in a virtual datacenter are described. In one example embodiment, a virtual machine (VM) that has or is scheduled to have an instance of an operating system (OS) that requires a license is identified. Availability of a physical processor of a first host computing system that is licensed to execute the OS based on the computing resource requirements of the VM, the physical processor based license, author assigned affinity to physical processors in the first host computing system is determined. The VM is then migrated/placed to/on the physical processor of the first host computing system or migrated/placed to/on a physical processor of a second host computing system based on the outcome of the determination.

15 Claims, 2 Drawing Sheets

(56) References Cited

U.S. PATENT DOCUMENTS

| | | |
|---|---|---|
| 2010/0306382 A1 | 12/2010 | Cardosa et al. |
| 2011/0119191 A1* | 5/2011 | Stern .................. G06F 9/45533 705/59 |
| 2012/0297236 A1 | 11/2012 | Ziskind et al. |
| 2013/0055262 A1 | 2/2013 | Lubsey et al. |
| 2013/0198370 A1 | 8/2013 | Aguchi et al. |
| 2013/0297964 A1 | 11/2013 | Hegdal et al. |
| 2014/0007093 A1 | 1/2014 | Deshpande et al. |
| 2014/0164594 A1 | 6/2014 | Crowell et al. |
| 2014/0196038 A1 | 7/2014 | Kottomtharayil et al. |
| 2014/0344440 A1 | 11/2014 | Dutta et al. |
| 2015/0067143 A1 | 3/2015 | Babakhan et al. |
| 2015/0286492 A1 | 10/2015 | Breitgand et al. |
| 2017/0097845 A1* | 4/2017 | Kouznetsov ........ G06F 9/45558 |

OTHER PUBLICATIONS

"Virtualization: State of the Art", SCOPE Alliance, Version 1.0, Apr. 2008 http://www.profsandhu.com/cs6393__s14/SCOPE-Virtualization-StateofTheArt-Version-1.0.pdf (Year: 2008).

Bari et al. "Data Center Network Virtualization: A Survey", IEEE Communications Surveys & Tutorials, vol. 15 No. 2, Second Quarter 2013 https://ieeexplore.ieee.org/document/6308765/ (Year: 2013).

* cited by examiner

MINIMIZING GUEST OPERATING SYSTEM LICENSING COSTS IN A PROCESSOR BASED LICENSING MODEL IN A VIRTUAL DATACENTER

RELATED APPLICATIONS

Benefit is claimed under 35 U.S.C. 119(a)-(d) to Foreign application Serial No. 5936/CHE/2014 filed in India entitled "MINIMIZING GUEST OPERATING SYSTEM LICENSING COSTS IN A PROCESSOR BASED LICENSING MODEL IN A VIRTUAL DATACENTER", filed on Nov. 26, 2014, by VMware, Inc., which is herein incorporated in its entirety by reference for all purposes.

BACKGROUND

For any modern organization acquiring and managing information technology (IT) is a major budgetary concern. Moreover, the local IT hardware in many instances is seldom used at full capacity. Soto reduce IT infrastructure costs and waste, instead of acquiring new physical hardware, organizations increasingly are sharing resources by replacing some local computers with virtual machines (VMs). Virtual Machines (VMs) are software abstractions of computer hardware that run on a physical host computer system and function as self-contained platforms, running their own operating systems (Oss) and software applications. Each VM has allocated capacity, for example, disk space, processing resources, memory, application software, operating system (OS) and the like and is configured (software stack and licenses) for its intended purpose and expected needs.

Virtualization management software (VMS) may provide a centralized and extensive platform for managing virtual machines within a virtual data center which can be a subset of a physical datacenter and/or span multiple data centers. Virtual data centers, typically, comprise multiple host computing systems that are managed by the VMS. Virtual machines are often accessed remotely using various remote protocols or systems in order to service or manage applications and/or guest OSs running on them.

Existing techniques place VMs primarily based on provider system optimization, workload predictions and results obtained from continuously monitoring VM resource usage during operation. VM placement is the process of distributing a set of virtual machines across multiple physical servers. Preferably, the distribution should satisfy a number of above outlined constraints. Under-allocation, wastes resources and energy and reduces the capacity available to other users. Over-allocation impairs the users Quality-of-Service (QoS). Preferably, adequate IT resources are allocated without waste, and while also maintaining the desktop user's QoS. Optimizing VM placement reduces server and overall operational costs of the IT infrastructure costs. Further, existing techniques when placing VMs, fail to account for significant factors that may strongly impact overall IT infrastructure costs.

SUMMARY

One or more embodiments disclosed herein provide a method for minimizing guest OS licensing costs in a processor based guest OS licensing model in a virtual datacenter. In one aspect, the method includes, a virtual machine (VM) that has or is scheduled to have an instance of an operating system (OS) that requires a license is identified. Availability of a physical processor of a first host computing system that is licensed to execute the OS based on the computing resource requirements of the VM, the physical processor based license, and/or assigned affinity to physical processors in the first host computing system is determined. The VM is then migrated/placed to/on the physical processor of the first host computing system or migrated/placed to/on a physical processor of a second host computing system based on the outcome of the determination.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution of a virtual machine. The instructions, when executed in a computing device, perform the steps for minimizing guest OS licensing costs in a processor based guest OS licensing model in a virtual datacenter.

Embodiments of the present disclosure provide a computer system. The computing system includes multiple host computing systems in a failover cluster in a virtual datacenter. The computing system further includes a network that is communicatively coupled to the multiple host computing systems. Moreover, the computing system includes a management server that is communicatively coupled to the network, wherein the management server includes a virtual management software, which further includes an OS licensing and optimizing module and each of the multiple host computing systems includes an associated failover agent, wherein the guest OS cost optimization module is configured to minimize guest OS licensing costs in a processor based guest OS licensing model in a virtual datacenter.

DETAILED DESCRIPTION

Embodiments described herein provide a technique for minimizing guest operating system licensing costs in a processor based guest operating system (OS) licensing model in a virtual datacenter. The technique provides cost optimization based on processor/socket/package/core based licensing for desktop and server guest OSs. Also, the technique takes advantage of running multiple VMs on a host computing system that runs a given type of OS provided there is needed computing resources and meets the processor based licensing requirements. Further, the technique may be used when using dynamic resource scheduling (DRS)/distributed power management (DPM) for placing/migrating VMs. Furthermore, the technique minimizes guest OS licensing costs in a processor based guest OS licensing model during initial VM placement, during automated VM placement, such as DRS/DPM, and during manual VM placement and allocation. In addition, the technique minimizes guest OS licensing costs by reusing guest OS licenses already assigned to the powered off and/or idle VMs in the datacenter.

The terms "placing" and "provisioning" may be used interchangeably throughout the document. Also, the terms "OS" and "guest OS" are used interchangeably throughout the document. Further, the term "processor" may refer to terms, such as, "socket", "package" and/or "core". Furthermore, the language "assigned affinity to physical processors" may refer to pre-assigning some physical processors of a set of physical host computing systems to run on a certain type of guest OSs. In addition, the term "processor based licensing model" may refer to licensing a host computing system or clusters of host computing systems in a virtual datacenter based upon a number/count of physical processors, which may entitle running up to a threshold number of VMs on the host computing system or dusters in the virtual datacenter (for example, number of OS licenses may equal the number of physical processors on a host computing system multiplied by an applicable core factor, such as 0.75).

System Overview and Examples of Operation

Figure 1:
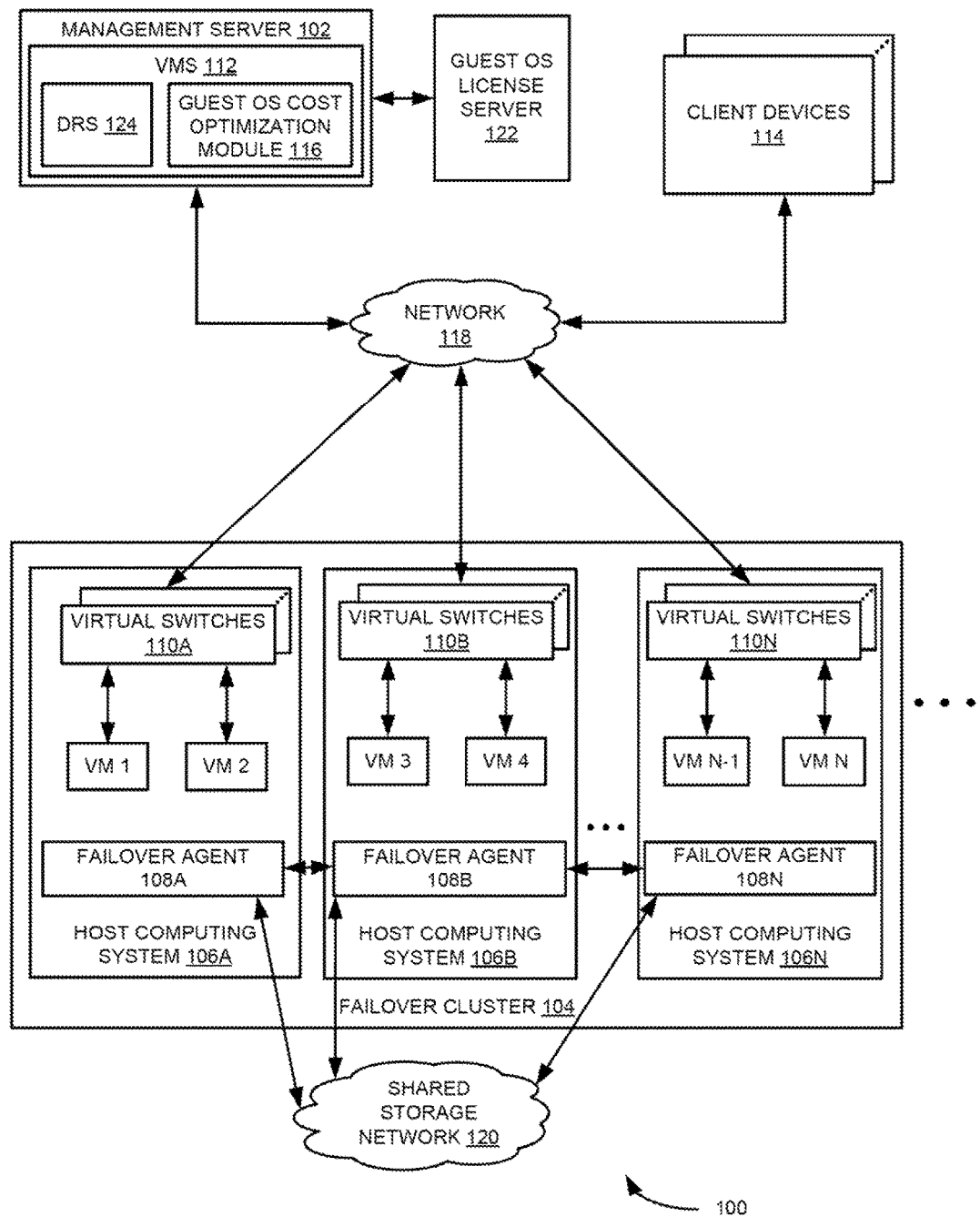
FIG. 1 is a block diagram illustrating system for minimizing guest OS licensing costs in a processor based licensing model in a virtual datacenter, according to an example embodiment.

FIG. 1 is a block diagram illustrating system for minimizing guest OS licensing costs in a processor based licensing model in virtual datacenter 100, according to an example embodiment. As shown in FIG. 1, system 100 includes multiple host computing systems 106A-N and associated virtual machines (VMs) VM1-N hosted by multiple host computing systems 106A-N in a failover cluster 104. Also as shown in FIG. 1, system 100 includes management server 102 that is communicatively coupled to multiple host computing systems 106B-N via, network 118 via associated virtual switches 110 A-N. Further as shown in FIG. 1, management server 102 includes virtual management software (VMS) 112, which in turn includes guest OS cost optimization module 116. Furthermore as shown in FIG. 1, multiple host computing systems 106A-N include associated fail over agents 108A-N. In addition, as shown in FIG. 1, network 118 is communicatively coupled to client devices 114. Also as shown in FIG. 1, each of multiple host computing systems 106 A-N is connected to the shared storage network 120. Further as shown in FIG. 1, management server 102 is coupled to a guest OS license server 122.

In operation, guest OS optimization module 116 may identify a VIM VM1 that has or is scheduled to have an instance of an OS requiring a license. In some embodiments, guest OS cost optimization module 116 may receive a request to migrate/place the VM that has or is scheduled to have the instance of the OS that requires license in virtual datacenter 100. Exemplary requests to create the VM VM1 can come from client devices 114 upon virtual datacenter 100 startup/provisioning, upon a generated recommendation to migrate/place a VM during runtime from dynamic resource scheduler (DRS) 124

Further in some embodiments, VMS 112 may then create the VM VM1 based on compute, network and/or storage demand requirements upon receiving the request to migrate/place the first VM VM1 running on a first type of guest OS. In some embodiments, guest OS cost optimization module 116 installs/builds the first type of guest OS on the VM VM1 associated with first host computing system 106A in virtual datacenter 100. Guest OS cost optimization module 116 then keeps VM VM1 having the first type of guest OS in a powered off mode to avoid violation of licensing terms.

Guest OS licensing module 116 may then determine whether a physical processor of a first host computing system exists that is licensed to execute the OS based on the computing resource requirements of the VM VM1, the physical processor based license, and/or assigned affinity to physical processors of the first host computing system. In some embodiments, guest OS cost optimization module 116 then determines whether there is a licensed physical core available in a first host computing system in the virtual datacenter that has a spare capacity to run the VM based on the computing resource requirements of the VM, the physical core/processor based license, and/or assigned affinity to physical cores in the first host computing system 106A to run a first type of guest OS.

Guest OS optimization module 116 may then migrate/place the VM VM1 to/on the physical core of the first host computing system if a physical processor of a first host computing system exists that is licensed to execute the OS based on the computing resource requirements of the VM VM1, the physical processor based license, and/or assigned affinity to physical processors of the first host computing system. In some embodiment, guest OS cost optimization module 116 places the VM VM1 on the available physical core of the first host computing system 106A if a licensed physical core is available in first host computing system 106A in the virtual datacenter that has spare capacity to run the VM. Guest OS cost optimization module 116 then powers on the VM VM1 on first host computing system 106A.

Guest OS optimization module 116 may then migrate/place VM VM1 to/on a physical core of a second host computing system by assigning a physical processor based license if a physical processor of a first host computing system does not exist that is licensed to execute the OS based on the computing resource requirements of the VM, the physical processor based license, and/or assigned affinity to physical processors of the first host computing system. In some embodiments, guest OS cost optimization module 116 places the VM VM1 on a physical core of second host computing system 106B by assigning a physical core/processor based license if a licensed physical core is not available in first host computing system 106A in the virtual datacenter that has spare capacity to run the VM. Guest OS cost optimization module 116 then powers on the placed VM VM1 on the physical core of second host computing system 106B.

Also, although certain terms are used primarily herein, other terms could be used interchangeably to yield equivalent embodiments and examples. For example, the term "host computing system" may be used interchangeably with "physical host", "physical machine" or "physical device". Further for example, it is well-known that equivalent terms in the field of system virtualization or similar or related fields could be substituted for such terms as "physical computer," "hypervisor," "virtual machine," or the like. Further, the terms "virtual computing environment" and "virtual datacenter" are used interchangeably throughout the document. The terms "network failure", "network connectivity failure", and "lost network connectivity" are used interchangeably throughout the document.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 2:
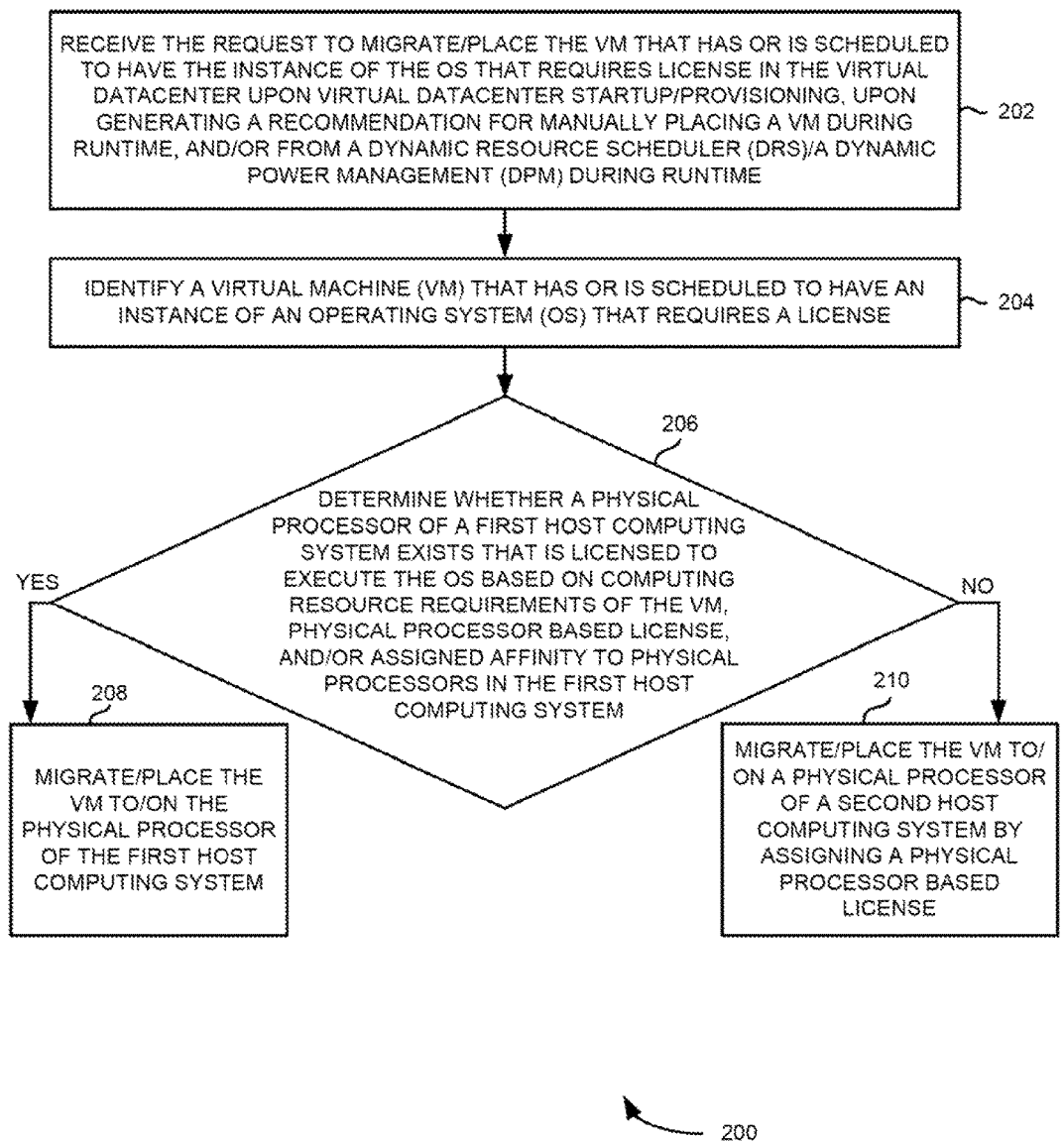
FIG. 2 is a flow diagram of process for minimizing guest OS licensing costs in a processor based licensing model in a virtual datacenter, according to an example embodiment.

FIG. 2 is a flow diagram of process 200, for minimizing guest OS licensing costs in a processor based licensing model in a virtual datacenter, according to an example embodiment.

At block 202 process 200, receives a request to migrate/place a VM that has or is scheduled to have the instance of the OS that requires license in the virtual datacenter. In some embodiments, process 200 may receive a request to migrate/place the VM running a first type of guest OS that has or is scheduled to have the instance of the OS that requires license in the virtual datacenter upon virtual datacenter stag-up/provisioning, from a recommendation generated manually during runtime, and/or from dynamic resource scheduler (DRS) during runtime, or from dynamic power management (DPM) during runtime. Further in some embodiments, the request to place a VM comes from cold migration.

At block 204, a VM that has or is scheduled to have an instance of an OS that requires license is identified. In some embodiments, the first VM is created based on computing resource requirements upon receiving the request to place the first VM that runs on a first type of guest OS. Exemplary computing resource requirements are compute requirements, storage requirements and/or network requirements. In these embodiments, the VM is built/installed based on the computing resource requirements upon receiving the request to place the VM that runs on the first type of guest OS. Further in these embodiments, the created VM having the first type of guest OS is kept in a powered off mode.

At block 206, process 200 determines whether a physical processor of a first host computing system exists that is licensed to execute the OS based on the computing resource requirements of the VM, the physical processor based license, and/or assigned affinity to physical processors of the first host computing system.

Based on the outcome of the determination at block 206, process 200 goes to block 208 migrates/places the VM on the physical core of the first host computing system if the a physical processor of a first host computing system exists that is licensed to execute the OS based on the computing resource requirements of the VM, the physical processor based license, and/or assigned affinity to physical processors of the first host computing system.

Based on the outcome of determination at block 206, process 200 goes to block 210 and migrates/places the VM on a physical core of a second host computing system by assigning a physical processor based license if a physical processor of a first host computing system does not exist that is licensed to execute the OS based on the computing resource requirements of the VM, the physical processor based license, and/or assigned affinity to physical processors of the first host computing system.

Process 200 for minimizing guest OS licensing, costs in a processor based licensing, model in a virtual datacenter is explained in more detail above with reference to the system diagram 100 shown in FIG. 1.

The architecture shown in FIGS. 1-2 may in some embodiments be partially or fully virtualized. For example, system and method 100 and 200 shown in FIG. 1 and FIG. 2, respectively, may be one or possibly many VMs executing on physical hardware and managed by a hypervisor, VM monitor, or similar technology. Also, multiple host computing systems 106 A-N shown in FIGS. 1-2 may include virtualization logic to manage multiple VMs.

In an example embodiment, components/modules of VMS 112, guest OS cost optimization module 116 and DRS are implemented using standard programming techniques. In other embodiments, VMS 112 and guest OS cost optimization module 116 may be implemented as instructions processed by a VM that executes as one of other programs.

Furthermore, in some embodiments, some or all of the components of VMS 112, guest OS cost optimization module 116, and DRS may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and stems for optimizing guest OS utilization cost in a processor based licensing model in a virtualized datacenter are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for minimizing guest operating system (OS) licensing costs in a processor-based licensing model in a virtual datacenter, comprising:
    identifying a virtual machine (VM) that has or is scheduled to have an instance of a guest OS that requires a processor-based license;
    determining whether a physical processor of a first host computing system that is licensed to execute the guest OS is available based on computing resource requirements of the VM, the processor-based license, and assigned affinity to physical processors of the first host computing system, wherein the physical processor is one of the physical processors of the first host computing system that includes a spare capacity to run the VM, and wherein the assigned affinity to physical processors correspond to physical processors that are pre-assigned to run on a certain type of guest OS; and when the physical processor in the first host computing system that is licensed to execute the guest OS is available, migrating/placing the VM to/on to the physical processor of the first host computing system.

2. The method of claim 1, further comprising:

when the physical processor in the first host computing system that is licensed to execute the guest OS is not available, migrating/placing the VM to/on a physical processor of a second host computing system by assigning the processor-based license.

3. The method of claim 1, further comprising:

receiving a request to migrate/place the VM that has or is scheduled to have the instance of the guest OS that requires the processor-based license in the virtual datacenter.

4. The method of claim 3, wherein receiving the request to migrate/place the VM that has or is scheduled to have the instance of the guest OS that requires the processor-based license, comprises:

receiving the request to migrate/place the VM that has or is scheduled to have the instance of the guest OS that requires the processor-based license in the virtual datacenter upon virtual datacenter startup/provisioning, upon generating a recommendation for manually placing a VM during runtime, and/or from a dynamic resource scheduler (DRS)/a dynamic power management (DPM) during runtime.

5. The method of claim 1, wherein the computing resource requirements are compute requirements, storage requirements and/or network requirements.

6. A non-transitory computer-readable storage medium including instructions that are configured, when executed by a computing system, to perform a method for minimizing guest operating system (OS) licensing costs in a processor-based licensing model in a virtual datacenter, the method comprising:

identifying a virtual machine (VM) that has or is scheduled to have an instance of a guest OS that requires a processor-based license;

determining whether a physical processor of a first host computing system that is licensed to execute the guest OS is available based on computing resource requirements of the VM, the processor-based license, and assigned affinity to physical processors in the first host computing system, wherein the physical processor is one of the physical processors of the first host computing system that includes a spare capacity to run the VM, and wherein the assigned affinity to physical processors correspond to physical processors that are pre-assigned to run on a certain type of guest OS; and when the physical processor in the first host computing system that is licensed to execute the guest OS is available, migrating/placing the VM to/on to the physical processor of the first host computing system.

7. The non-transitory computer-readable storage medium of claim 6, further comprising:

when the physical processor in the first host computing system that is licensed to execute the guest OS is not available, migrating/placing the VM to/on a physical processor of a second host computing system by assigning the processor-based license.

8. The non-transitory computer-readable storage medium of claim 6, further comprising:

receiving a request to migrate/place the VM that has or is scheduled to have the instance of the guest OS that requires the processor-based license in the virtual datacenter.

9. The non-transitory computer-readable storage medium of claim 8, wherein receiving the request to migrate/place the VM that has or is scheduled to have the instance of the guest OS that requires the processor-based license, comprises:

receiving the request to migrate/place the VM that has or is scheduled to have the instance of the guest OS that requires the processor-based license in the virtual datacenter upon virtual datacenter startup/provisioning, upon generating a recommendation for manually placing a VM during runtime, and/or from a dynamic resource scheduler (DRS)/a dynamic power management (DPM) during runtime.

10. The non-transitory computer-readable storage medium of claim 6, wherein the computing resource requirements are compute requirements, storage requirements and/or network requirements.

11. A computing system for minimizing guest operating system (OS) licensing costs in a processor-based guest OS licensing model in a virtual datacenter, the system comprising:

multiple host computing systems, wherein each host computing system hosting multiple VMs;

a guest OS license server; and a management server communicatively coupled to the multiple host computing systems and the guest OS license server, wherein the management server comprising a processor and memory having a virtual management software (VMS), and wherein the VMS includes a guest OS cost optimization module, which is executed by the processor to:

identify a virtual machine (VM) that has or is scheduled to have an instance of a guest OS that requires a processor-based license;

determine whether a physical processor of a first host computing system that is licensed to execute the guest OS is available based on computing resource requirements of the VM, the processor-based license, and assigned affinity to physical processors of the first host computing system, wherein the physical processor is one of the physical processors of the first host computing system that includes a spare capacity to run the VM, and wherein the assigned affinity to physical processors correspond to physical processors that are pre-assigned to run on a certain type of guest OS; and when the physical processor in the first host computing system that is licensed to execute the guest OS is available, migrate/place the VM to/on the physical processor of the first host computing system.

12. The computing system of claim 11, further configured to:

when the physical processor in the first host computing system that is licensed to execute the guest OS is not available, migrate/place the VM to/on a physical processor of a second host computing system by assigning the processor-based license.

13. The computing system of claim 11, further configured to:

receiving a request to migrate/place the VM that has or is scheduled to have the instance of the guest OS that requires the processor-based license in the virtual datacenter.

14. The computing system of claim 13, wherein receiving the request to migrate/place the VM that has or is scheduled to have the instance of the guest OS that requires the processor-based license, comprises:
    receiving the request to migrate/place the VM that has or is scheduled to have the instance of the guest OS that requires the processor-based license in the virtual datacenter upon virtual datacenter startup/provisioning, upon generating a recommendation for manually placing a VM during runtime, and/or from a dynamic resource scheduler (DRS)/a dynamic power management (DPM) during runtime.

15. The computing system of claim 11, wherein the computing resource requirements are compute requirements, storage requirements and/or network requirements.

\* \* \* \* \*